United States Patent [19]

Long

[11] 4,029,483
[45] June 14, 1977

[54] DIVING BELL HEATER AND ABSORBENT SYSTEM

[76] Inventor: Richard William Long, 760 Wakefield Court, San Diego, Calif. 92020

[22] Filed: May 5, 1975

[21] Appl. No.: 575,050

[52] U.S. Cl. .................................. 55/68; 23/284; 55/269; 55/310; 55/387; 55/385 R; 128/142.3; 128/142.5; 61/69 R

[51] Int. Cl.$^2$ .................................... B01D 19/00

[58] Field of Search ............ 55/316, 208, 387, 68, 55/267–269, 473, 310, 385 R; 128/142.3, 142.5, 212; 23/284; 61/69 R

[56] References Cited

UNITED STATES PATENTS

| | | | |
|---|---|---|---|
| 2,160,831 | 6/1939 | Colby et al. | 55/269 |
| 3,067,560 | 12/1962 | Parker | 55/387 |
| 3,231,512 | 1/1966 | Harter | 55/208 |
| 3,449,761 | 6/1969 | Long | 2/2.1 R |
| 3,715,866 | 2/1973 | Chatlos et al. | 55/270 |
| 3,762,392 | 10/1973 | Long | 126/210 |

FOREIGN PATENTS OR APPLICATIONS 457,529  5/1950  Italy .................................. 55/267

Primary Examiner—Bernard Nozick
Attorney, Agent, or Firm—Brown & Martin

[57] ABSTRACT

A unit for use in a diving bell to heat and remove carbon dioxide from the breathing gas in the bell. A blower circulates the atmosphere in the diving bell through a heat exchanger, which is heated by hot water from an installation on the surface. Part of the air is vented back into the bell atmosphere and part is passed through a scrubbing canister containing material which removes carbon dioxide from the gas. The unit is very compact and the scrubbing canister is readily replaceable for servicing. In the hot water system, provision is made for controlling the flow and for delivering hot water to divers having heated suits.

9 Claims, 5 Drawing Figures

DIVING BELL HEATER AND ABSORBENT SYSTEM

BACKGROUND OF THE INVENTION

A diving bell is often used as a habitat for divers working at extreme depths for extended periods. The bell is internally pressurized to the pressure of the surrounding water, so that divers can enter and leave the bell without undesirable pressure changes. When working in cold water it is desirable to heat the bell for diver comfort, or the effective working time is greatly reduced. Electrical heating requires considerable power, which may be impractical to supply from the surface, and for which batteries are inadequate. To maintain heat in the bell it is necessary to recirculate some of the breathing gas, rather than rely on a constantly replenished supply from the surface. When recirculation is used, excess carbon dioxide must be removed from the breathing gas. Scrubbers for this purpose are available, but require forced flow to be effective and so necessitate another source of power.

SUMMARY OF THE INVENTION

The system described herein combines the heating and scrubbing functions in a single compact assembly. Breathing gas is circulated by a low powered blower which can be driven by on board batteries for a considerable period. Heating is provided by hot water pumped from the surface and through a heat exchanger in the unit, through which the breathing gas is blown. Part of the heated gas is vented directly into the bell atmosphere and the remainder passes through a scrubbing canister containing material which absorbs carbon dioxide. The scrubbing canister is readily replaceable, which comprises the only regular servicing needed for the unit, other than maintenance of the blower.

A suitable hot water source is described in U.S. Pat. No. 3,762,392, entitled "Hot Water Heater System for Divers". The system is intended for use with heated diving suits, as disclosed in U.S. Pat. No. 3,449,761, entitled "Heated Underwater Diving Suit", but is also ideal for the diving bell heater.

In the diving bell installation, the hot water is still supplied to divers working outside the bell, a part of the hot water supply being bypassed through the heater unit for internal heating of the bell. Valves are provided for full control of hot water flow to the internal heater and to the divers, and for dumping excess heat overboard when necessary.

The primary object of this invention, therefore, is to provide a new and improved diving bell heater and scrubber system.

Another object of this invention is to provide a diving bell heater and scrubber system which heats and recirculates the breathing gas in the internal atmosphere of a diving bell, utilizing hot water from an external source.

Another object of the invention is to provide a diving bell heater and scrubber system which removes carbon dioxide from the heated gas.

A further object of this invention is to provide a diving bell heater and scrubber system which is compact, requires very little power for its operation and is easily serviced.

Other objects and advantages will be apparent in the following detailed description, taken in conjunction with the accompanying drawings, in which.

DESCRIPTION OF THE PREFERRED EMBODIMENT

Figure 1:
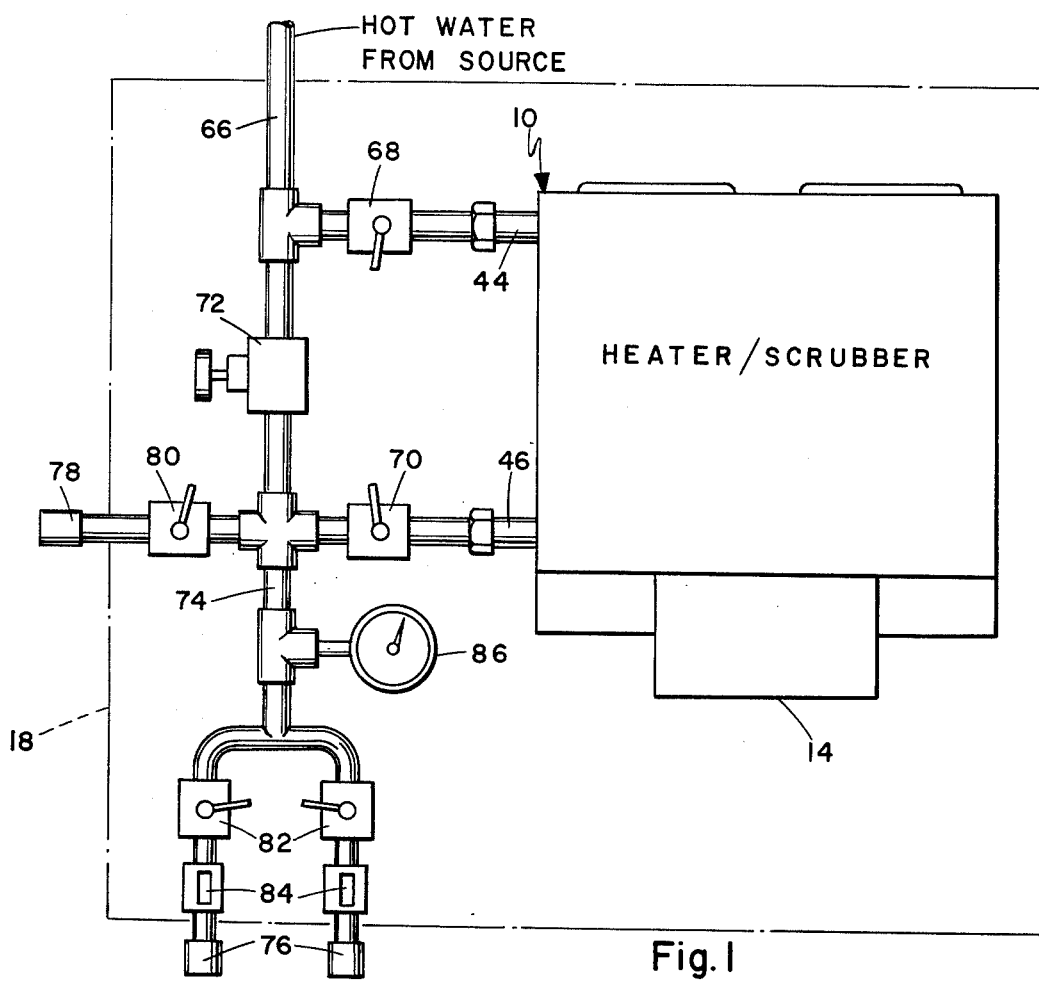
FIG. 1 is a diagram of the heater and scrubber unit with the associated hot water system.
Figure 2:
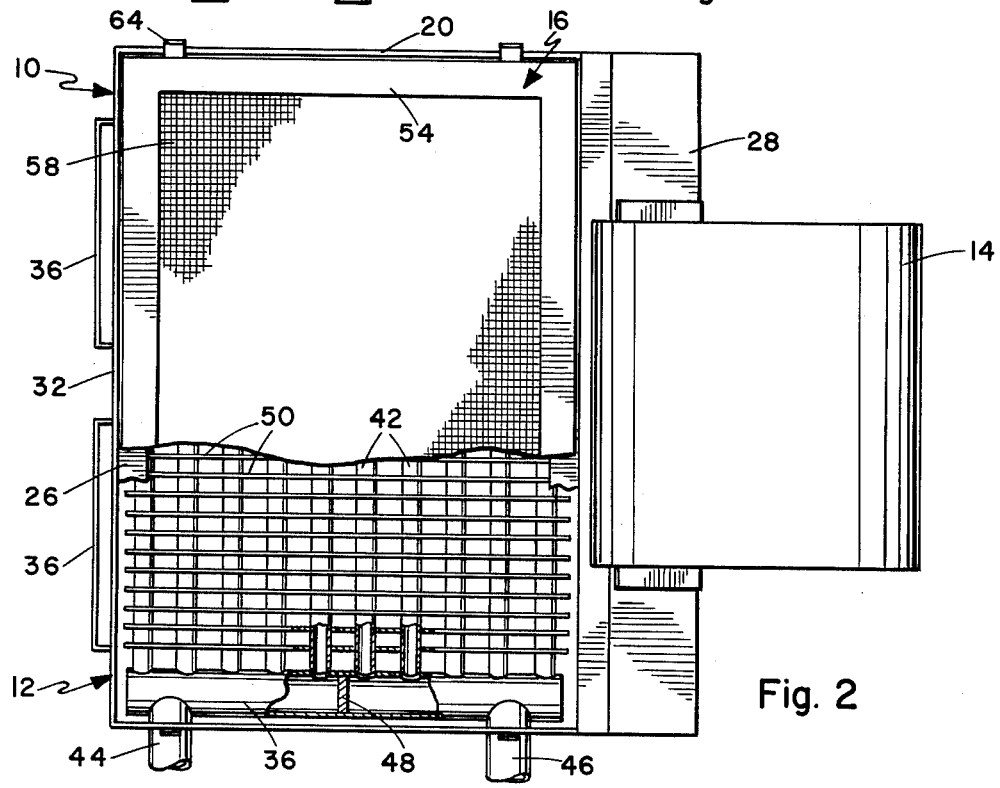
FIG. 2 is a top plan view of the heater and scrubber unit, with portions cut away.
Figure 3:
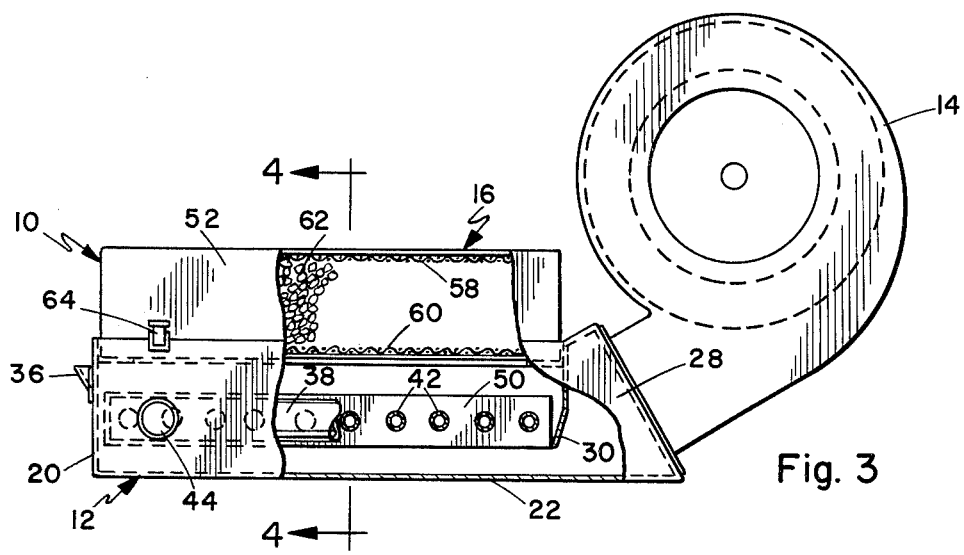
FIG. 3 is an end view as taken from below FIG. 2, with portions cut away.
Figure 4:
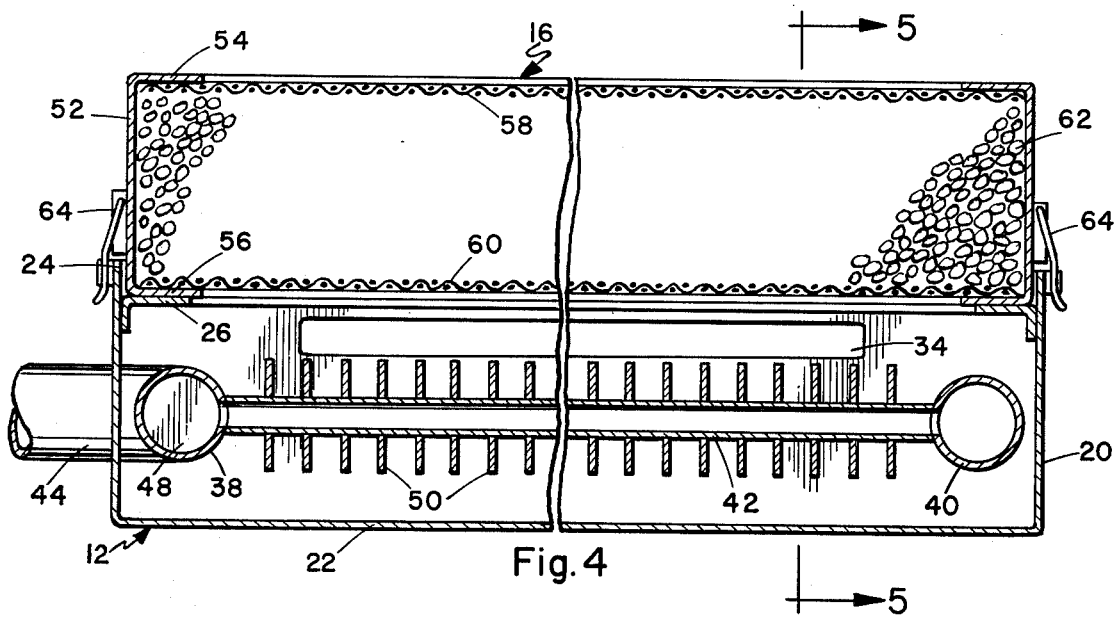
FIG. 4 is an enlarged sectional view taken on line 4—4 of FIG. 3.
Figure 5:
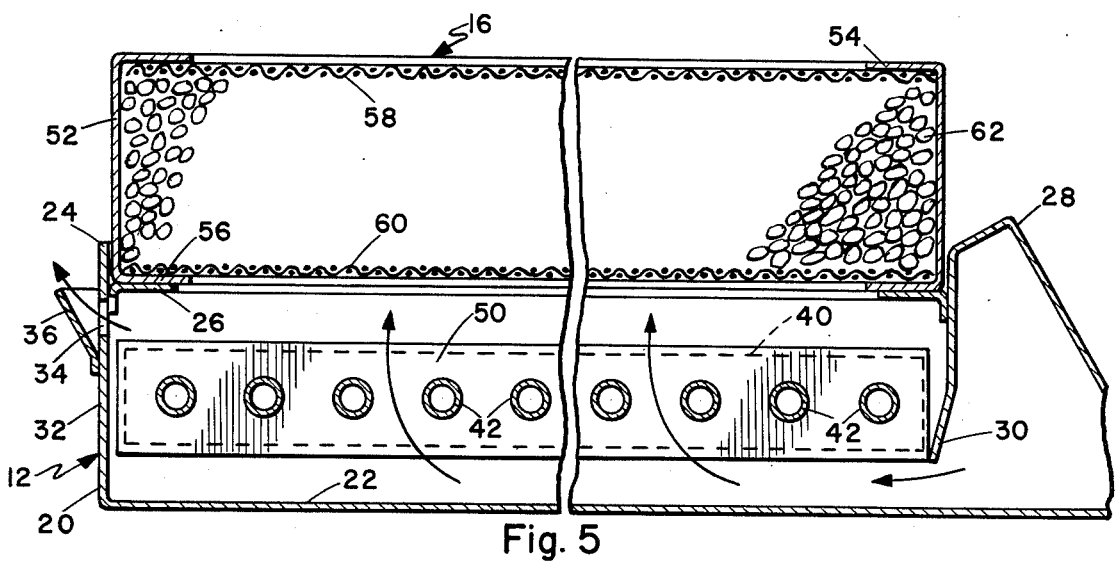
FIG. 5 is a sectional view taken on line 5—5 of FIG. 4.

The heater and scrubber unit 10 comprises three basic parts, a heat exchanger 12, a blower 14 and a scrubber 16. The assembly is compact and can be mounted in any suitable position in a diving bell 18, indicated diagramatically in FIG. 1.

Heat exchanger 12 is contained in a generally rectangular housing 20 having a closed base 22 and open at the top. Inset just below the upper edge 24 is an internal flange 26, which serves as a supporting platform for the scrubber 16. On one side of housing 20 is a plenum chamber 28 on which blower 14 is mounted. The blower is a suitable squirrel cage type unit with a self-contained motor, various types being readily available. Air or breathing gas from the ambient atmosphere in the diving bell is blown into the lower portion of housing 20 under a baffle 30, which forms an inner side wall of the housing. Th side wall 32 opposite plenum chamber 28 has an elongated vent slot 34 just below flange 26, with external louvers 36 to deflect the exhaust flow.

The heat exchanger element comprises a pair of manifolds 38 and 40 extending across opposite ends of housing 20, and interconnected by spaced parallel flow tubes 42. Manifold 38 has a water inlet 44 at one end and a water outlet 46 at the other end, and is separated into two halves by a central dividing wall 48. Incoming water flow is thus passed through half of the tubes 42 to manifold 40, which is unobstructed, and back through the other half of the tubes to the outlet side of manifold 38. Fixed to tubes 42 are spaced parellel fins 50, substantially perpendicular to the tubes to provide a large heat transfer area to the gas blown through the heat exchanger. The structure is supported in any suitable manner in housing 20, with fins 50 clear of the base 22. Breathing gas blown under baffle 30 passes up through the heating element and part of the heated gas exhausts through vent slot 34 to heat the interior of the diving bell. The remainder of the heated gas passes through scrubber 16 for removal of carbon dioxide.

Scrubber 16 conprises a rectangular canister having a peripheral wall 52, with inwardly turned upper and lower flanges 54, and 56, respectively. An upper perforated member 58 is secured to the underside of flange 54 and a lower perforated member 60 is secured on top of flange 56 to enclose the box structure. The perforated members may be of perforated sheet material, wire screen, or the like, with openings or mesh size small enough to prevent loss of the absorbent material 62. The carbon dioxide absorbent material can be of any well known type, such as sodasorb, baralime, lithium hydroxide or the like. The scrubber canister fits into the top of housing 20 and rests on flange 26. For ease of replacement, the scrubber is secured to the heat exchanger by latches 64, of the type used on lockers, luggage and the like. Since the unit is intended for operation in a high humidity environment, all structure should be of corrosion resistant or protected material, which will also avoid contamination of the breathing gas.

In the installation of the unit, hot water is provided through a supply hose 66, from a source such as that in above mentioned U.S. Pat. No. 3,762,392. The supply hose is connected to inlet 44 through a valve 68 and outlet 46 is connected back to the supply hose through a valve 70 in a bypass circuit. Between the inlet and outlet connections, the supply hose is provided with a flow control valve 72. Downstream of flow control valve 72, a supply stub 74 extends to a pair of diver's supply outlets 76, and an overboard dump outlet 78 is coupled to the supply hose through a valve 80. Each diver's supply outlet is for connection to a heated diver's suit and is provided with a shut-off valve 82 and a visual flow indicator 84 of readily available type. Also connected to the diver's supply is a temperature gauge 86, so that the supply of hot water to the divers can be monitored for temperature as well as flow rate.

In operation, valves 68 and 70 are opened as necessary to control bypass flow of hot water through the heat exchanger 12. With control valve 72 closed, all the hot water passes through the heat exchanger and will heat the interior of the bell rapidly. If the heat is excessive, valve 80 can be opened to dump hot water overboard. This technique is much more rapid than requesting adjustment in flow from the surface source of hot water, the results of which would not be immediately evident.

If divers are operating outside the bell and are coupled to supply outlets 76 for suit heating, valve 72 is opened to allow hot source water to flow directly to the divers. Valve 72 thus controls the diver's supply whether or not the heat exchanger is in use. It will be obvious that only one outlet 76 may be used, or that additional outlets may be provided for more than two divers outside the bell. Th diver's suits, as described in U.S. Pat. No. 3,449,761, have individual controls for heating control and distribution. However, the overboard dump valve 80 can also be used to control heating of the suits when required.

In addition to the heating, excess carbon dioxide is removed from the breathing gas. By preheating the gas in the heat exchanger befoe passing it through the scrubber, efficiency is improved and the useful life of the absorbent material is prolonged. Since the breathing gas is recycled to a considerable extent, the heat is retained in the bell and facilitates prolonged operation in cold water. In some diving bell operations with the bell pressurized to equalize external pressure, divers outside the bell may receive their breathing gas directly from the bell atmosphere, rather than from a separate supply. With the present system the breathing gas for the divers would be recycled, scrubbed and heated, adding to the comfort of the divers in cold water.

Having described my invention, I now claim:

1. A diving bell breathing gas heater and scrubber unit for installation in a diving bell and using hot water to heat the gas comprising:
    a housing having a bottom wall and an opening in the upper wall,
    said housing having a opening at one side of the lower wall for receiving ambient breathing gas therethrough for flow through said housing and out the upper opening,
    a blower mounted on said housng for blowing said gas through said side opening,
    heat exchanger means positioned in the lower portion of said housing for heating the said gas,
    said heat exchanger having an inlet and outlet with means for connection to a source of heated water external to the diving bell,
    a scrubber canister containing carbon dioxide absorbent material mounted in the top portion of the housing to receive said gas blown through the heat exchanger in the movement through the housing and out the upper opening,
    said housing having a side vent opening between the heat exchanger and the scrubber canister for venting part of the said gas away from passage through the scrubber canister,
    and said upper portion of said housing holding said scrubber canister being removable allowing said scrubber canister to be selectively removed and changed, whereby in a single installation air in a diving bell is continuously heated and re-heated and the carbon dioxide is removed.

2. A diving bell breathing gas heater and scrubber system according to claim 1, and including control means for controlling hot water flow through said heat exchanger, said control means having an overboard dump outlet externally of the diving bell.

3. A diving bell breathing gas heater and scrubber system according to claim 1, wherein said heat exchanger comprises a pair of elongated manifolds with multiple water conducting tubes extending therebetween, and heat radiating fins on said tubes;
    one of said manifolds having a dividing wall substantially centrally therein;
    and said inlet and outlet being connected to opposite ends of said one manifold.

4. A diving bell breathing gas heater and scrubber system according to claim 1, wherein said means for connection to a source of hot water comprises a water supply hose having a flow control valve therein;
    said inlet and outlet being connected to said supply hose on opposite sides of the flow control valve;
    and said inlet and outlet each having a control valve therein.

5. A diving bell breathing gas heater and scrubber system according to claim 4, and including diver's supply outlets on said supply hose for connection to diver's heated suits, each of said diver's supply outlets having a control valve therein downstream from the connection of the supply hose to the heat exchanger outlet.

6. A diving bell breathing gas heater and scrubber system according to claim 5, and including an overboard dump outlet connected to said supply hose downstream of said flow control valve.

7. A diving bell breathing gas heater and scrubber system according to claim 1, wherein said heat exchanger is spaced above said lower wall,
    said blower being mounted on one side of said housing to blow gas through said side openings under the heat exchanger,
    and the other side of said housing having said side vent above the heat exchanger.

8. A diving bell breathing gas heater and scrubber system according to claim 7, wherein said scrubber canister has perforated panels on opposite sides for passage of gas therethrough.

9. The method of heating and removing carbon dioxide from breathing gas such as air that is introduced into a diving bell or that is circulated in a diving bell, comprising the steps of:

positioning a housing within the diving bell, moving air by a blower from the bottom part of the housing out an opening in the top of the housing, heating the moving air in the bottom part of the housing by a hot water heat exchanger, removing carbon dioxide from the air by means of a carbon dioxide absorbent material positioned in the upper part of the housing, feeding hot water to the heat exchanger from a source external to the diving bell, venting of a portion of the heated air from the bottom part of the housing while passing the remaining portion of the heated air through the upper portion of the housing so that all the air passing through the bottom part of the housing does not have to pass through the carbon dioxide absorbent material if the material becomes clogged, and selectively removing the upper part of the housing containing the carbon dioxide absorbent material to replace the absorbent material in the housing.

* * * * *